(12) United States Patent
Vijayan (10) Patent No.: US 6,832,341 B1
(45) Date of Patent: Dec. 14, 2004

(54) FAULT EVENT MANAGEMENT USING FAULT MONITORING POINTS

(75) Inventor: Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,273

(22) Filed: Sep. 23, 1999

(51) Int. Cl.[7] ............................................. G06F 11/00
(52) U.S. Cl. .............................. 714/43; 714/4; 714/47; 719/318; 709/224
(58) Field of Search .............................. 714/43, 4, 47; 709/318, 224

(56) References Cited

U.S. PATENT DOCUMENTS

| | | | |
|---|---|---|---|
| 5,664,093 A | | 9/1997 | Barnett et al. .......... 395/183.07 |
| 5,666,481 A | * | 9/1997 | Lewis ............................ 714/4 |
| 5,696,486 A | | 12/1997 | Poliquin et al. ............. 340/506 |
| 5,758,083 A | * | 5/1998 | Singh et al. ................. 709/223 |
| 5,777,549 A | | 7/1998 | Arrowsmith et al. ........ 340/506 |
| 5,841,960 A | | 11/1998 | Ibusuki et al. .......... 395/183.08 |
| 5,845,061 A | | 12/1998 | Mijamoto et al. ...... 395/182.02 |
| 5,872,911 A | * | 2/1999 | Berg ............................ 714/43 |
| 5,875,242 A | | 2/1999 | Glaser et al. ................ 379/207 |
| 5,892,898 A | | 4/1999 | Fujii et al. ................ 395/185.1 |
| 5,905,715 A | | 5/1999 | Azarmi et al. .............. 370/244 |
| 5,919,258 A | * | 7/1999 | Kayashima et al. ......... 713/201 |
| 6,112,236 A | * | 8/2000 | Dollin et al. ................ 709/224 |
| 6,131,112 A | * | 10/2000 | Lewis et al. ................. 709/207 |
| 6,243,838 B1 | * | 6/2001 | Liu et al. ....................... 714/57 |
| 6,324,658 B1 | * | 11/2001 | Jasperneite et al. ........... 714/43 |
| 6,347,374 B1 | * | 2/2002 | Drake et al. ................. 713/200 |
| 6,353,902 B1 | * | 3/2002 | Kulatunge et al. .......... 714/712 |
| 6,446,134 B1 | * | 9/2002 | Nakamura ................... 709/313 |
| 6,446,222 B1 | * | 9/2002 | Phaal ........................... 714/43 |
| 6,470,388 B1 | * | 10/2002 | Niemi et al. ................ 709/224 |
| 6,473,407 B1 | * | 10/2002 | Ditmer et al. .............. 370/252 |
| 6,502,131 B1 | * | 12/2002 | Vaid et al. ................... 709/224 |
| 6,631,409 B1 | * | 10/2003 | Watson et al. .............. 709/224 |
| 6,643,693 B1 | * | 11/2003 | Reynolds et al. ........... 709/223 |
| 6,654,914 B1 | * | 11/2003 | Kaffine et al. ................ 714/43 |
| 6,687,750 B1 | * | 2/2004 | Messinger et al. .......... 709/224 |

* cited by examiner

Primary Examiner—Scott Baderman
Assistant Examiner—Anne L. Damiano
(74) Attorney, Agent, or Firm—Duke W. Yee; David A. Mims, Jr.; Cathrine K. Kinslow (57) ABSTRACT

A method for monitoring faults within a computer network. In a preferred embodiment, an event, a host, and a fault monitoring point triplet are received from a monitored network device. A database of valid fault monitoring points is consulted to determine the validity of the event, host, and fault monitoring point triplet received. Responsive to a determination that the event, host, and fault monitoring point triplet received are valid, the appropriate party to notify and the appropriate message to send are determined. The appropriate party is then sent a message alerting them to the network problem. Different parties may be notified depending on the nature of the event or on the location of the event. Furthermore, a new network device may be added without taking down the fault monitoring system by merely adding to the database of valid fault monitoring points a new fault monitoring point corresponding to the added network device.

9 Claims, 5 Drawing Sheets

FIG. 4    FMP USAGE IN ALERT MANAGEMENT PROCESS

FIG. 5

```
CLASS FAST_InterfaceDown
    Select
        1: ATTR(=,$ENTERPRISE)  ,  VALUE(PREFIX, "1.3.6.1.4.1.2.6.3.1" ) ;
        2: $SPECIFIC = 30001 ;
        3: ATTR(=, "nvObject" ) ;
        4: ATTR(=, "nvEventInfo" ) ;
    FETCH
        1: IPADDR($V3);
    MAP
        origin = $F1 ;
        hostname = $V3 ;
        fmp = $V4 ;
        adapter_host = netview1.austin.ibm.com ;
END
```

FIG. 7

FAST EVENT HANDLING USING
(EVENT, HOSTNAME, FMP)

*FIG. 6*

```
CLASS FAST_ResourceProb
   SELECT
      1: ATTR(=,$ENTERPRISE) , VALUE(PREFIX, "1.3.6.1.4.1.9" ) ;
      2: $SPECIFIC = 205 ;
      3: ATTR(=, "sm6000armNode" ) ;
      4: ATTR(=, "sm6000armDesc" ) ;

MAP
      hostname = $V3 ;
      fmp = $V4 ;
      msg = "CISCO Router IDF Room Temperature";
      adapter_host = netview1.austin.ibm.com ;
END
```

*FIG. 8*

FAULT EVENT MANAGEMENT USING FAULT MONITORING POINTS

BACKGROUND OF THE INVENTION

1. Technical Field

The present invention relates to distributed data processing systems and in particular to fault event management systems.

2. Description of Related Art

Computer networks allow increased computing power, sharing of resources, and communications between users. These networks have grown to represent large investments on the parts of businesses, governments and educational institutions and these organizations spend large amounts of time and money maintaining their networks. According to industry research, an average 5000-user corporate network costs more than $6.4 million to support each year. Thus, to many network decision makers the real concern, as we head into the 21st century, is not so much migrating to faster technologies such as asynchronous transfer mode (ATM), but reducing the costs associated with supporting and operating the networks they use today.

One of the principle costs associated with maintaining a network is the time spent on system management. Networks are not static systems. As companies and organizations grow and change, so do their networks. Thus, network devices are constantly being added or replaced to meet the changing needs of the people using the network. When new devices are added or old ones replaced, the new devices need to be integrated into the Fault Management System. A Fault Management System monitors the hardware portions and software applications of the network for failures. Currently, this involves reprogramming various aspects of the network to ensure that all aspects of the network function correctly.

However, networks have become much larger and complex over the years and changes to the network take place much more frequently. Many network administrators have limited knowledge or interest in programming. Furthermore, even those administrators with the knowledge to reprogram the network lack the time to do so. Therefore, it is desirable to have an error free dynamic method to easily integrate monitoring changes into the Fault Management System in a matter of seconds.

SUMMARY OF THE INVENTION

The present invention provides a method for monitoring faults within a computer network. In a preferred embodiment, an event, a host, and a fault monitoring point triplet are received from a monitored network device. A database of valid fault monitoring points is consulted to determine the validity of the event, host, and fault monitoring point triplet received. Responsive to a determination that the event, host, and fault monitoring point triplet received are valid, the appropriate party to notify and the appropriate message to send are determined. The appropriate party is then sent a message alerting them to the network problem. Different parties may be notified depending on the nature of the event or on the location of the event. Furthermore, a new network device may be added without taking down the fault monitoring system by merely adding to the database of valid fault monitoring points a new fault monitoring point corresponding to the added network device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8 and 9 illustrate examples of sending an FMP as an attribute from a Netview Adapter according to the present invention.

DETAILED DESCRIPTION OF THE PREFERRED EMBODIMENT

Figure 1:
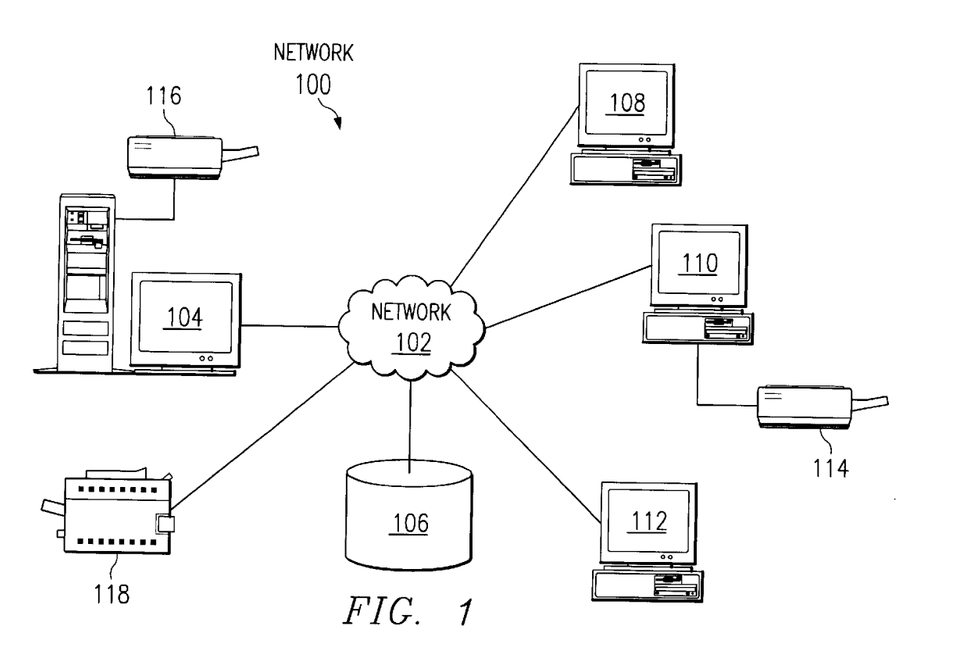
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
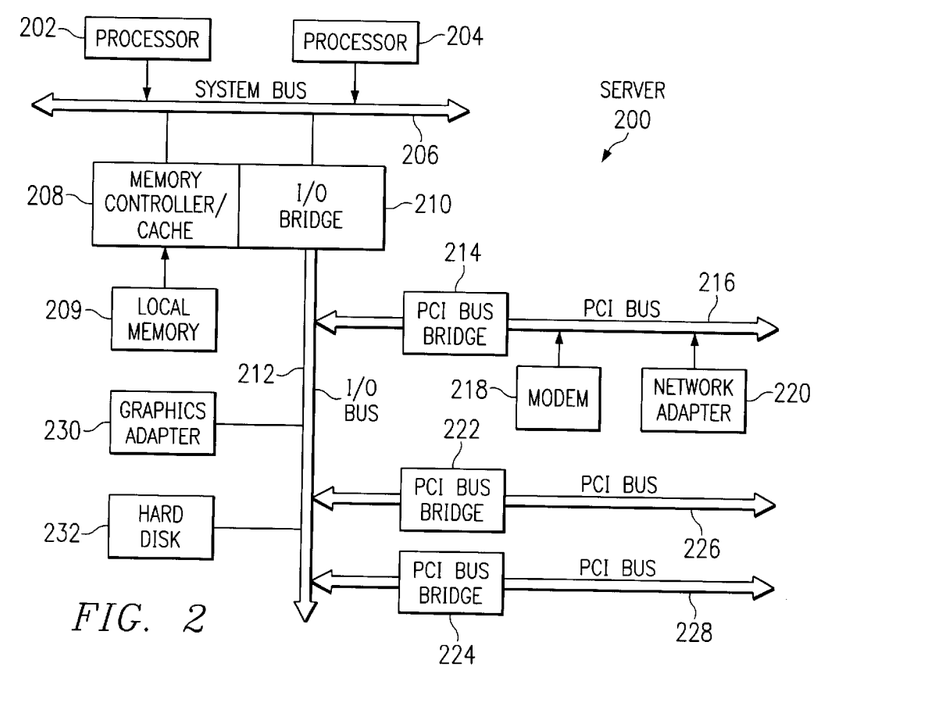
FIG. 2 depicts a block diagram of a data processing system that may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be 10 connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
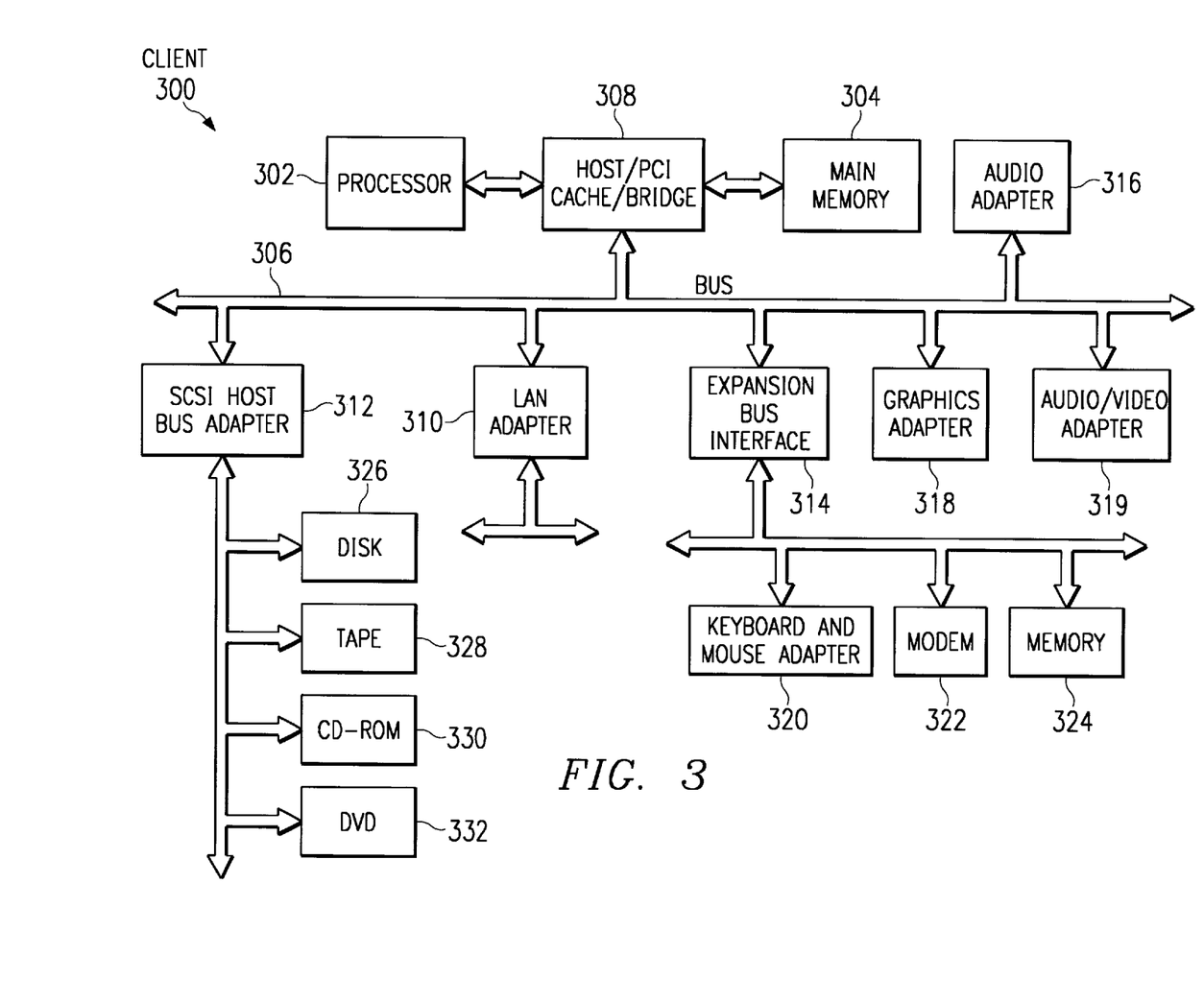
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
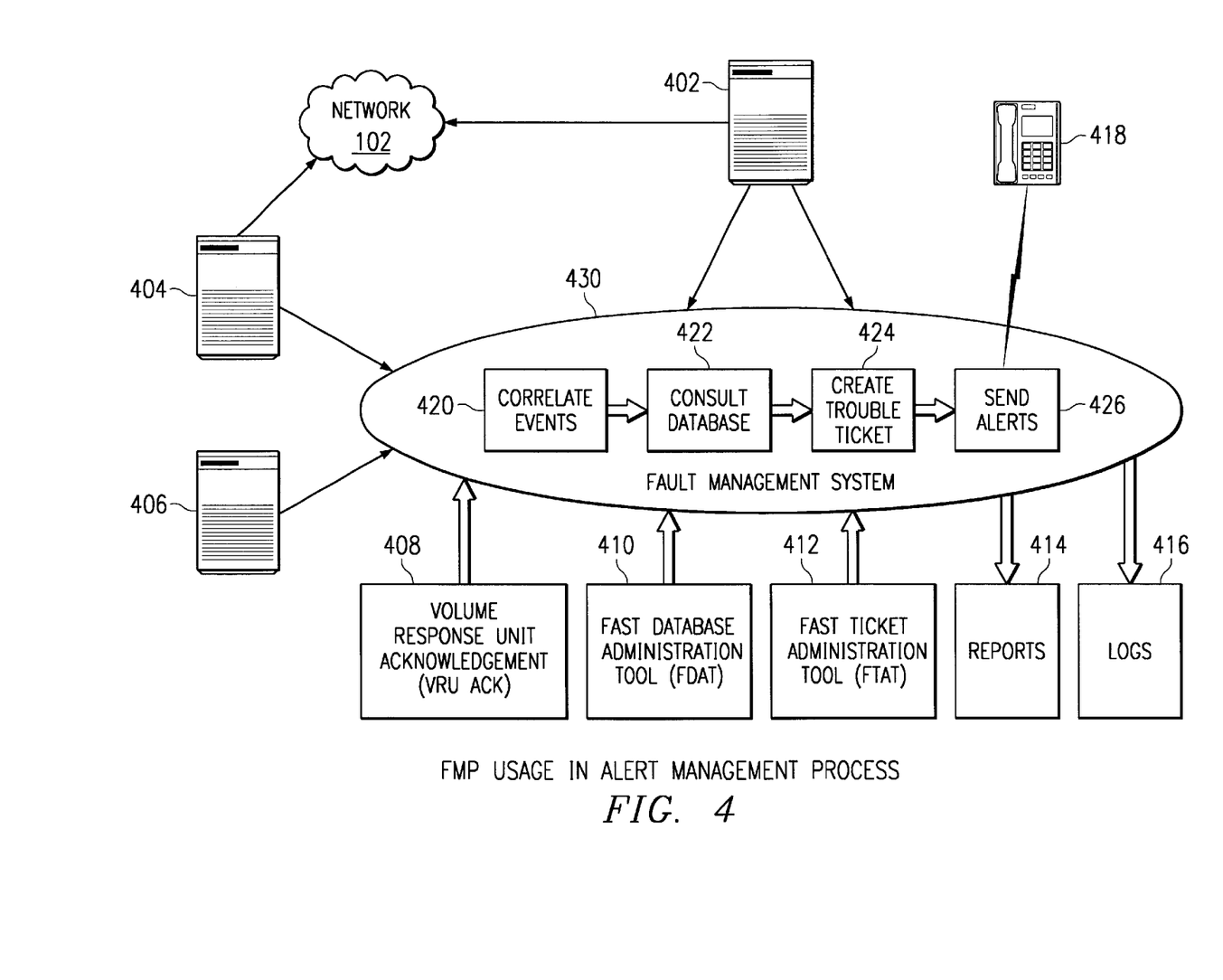
FIG. 4 shows a block diagram illustrating the fault management system of the present invention.

Turning now to FIG. 4, there is shown a block diagram illustrating the fault management system of the present invention. Polling engines 402, 404, and 406 receive event information in the form of an event, host, fault management point (FMP) triplet from network devices located on network 102 and sends this (event, host, FMP) triplet on to fault management system 430.

In a specific embodiment, the present invention may be implemented in Netview, a product of the International Business Machines Corporation, Armonk, N.Y. In this embodiment, several methods of detecting new additions to a network are possible. In one method, when a new router is added to the network and the auto discovery feature is on, Netview can detect the router and add it to its polling list. In another method, the new router can be added to the Netview seed file and right Simple Network Management Protocol (SNMP) permissions set without having the auto discover feature on. In yet another method, if Netview is monitoring twenty interfaces on a router and a new interface is added to the router, this new interface will automatically be included during the SNMP configuration check. The frequency of the SNMP routine can be controlled by the network administrator.

Once fault management system 430 receives the event, host, FMP triplet, the triplet is correlated (step 420). The correlation process proceeds as follows, as the events are received by fault management system 430, the events are checked for duplication. If the event name, host name and FMP are identical, then the duplicate event is dropped, otherwise it is processed further by Fault management system 430. Redundant events are closed. For example, if fault management system 430 has already received three Interface Down events from the same host name for different FMPs (interfaces), and a Node Down event is received, the three Interface Down events are closed because Node Down reflects the real problem event. Similar correlation logic for all common events is built into the rules that are executed by fault event management system 430.

Once an event is declared as not a duplicate, the database is consulted to check if the event and host is defined in the database (step 422). If the event and host are found, but the FMP is not found, the event is still not dropped. Every event host definition has a default FMP associated with it. The cool off timeout, escalation levels, target pager group information, etc. is always available for an (event, host, default FMP) triple. The cool off timeout is the first timeout defined for any (event, host, FMP) triplet and the default time that is allowed for a good event to close the problem event. If the (event, host, FMP) triplet is found in the database, then the database information pertaining to the requested triplet is used. This method of implementation allows fault management of new devices added to the network even if the administrator has not yet configured the alert in the database.

If the (event, host, fmp) triplet is not dropped, and the cooloff timeout is expired and the status of the event is still open, then a trouble ticket is created (step 424) containing the information regarding the problem encountered by the device, which device the problem occurred on, and the physical location of the device. Next an alert is sent (step 426) to the appropriate group, organization, or individual 418 assigned to deal with this particular problem. The group, organization, or individual 418 may vary depending on physical location of the device, time of day, and/or type of problem involved as well as any of a number of other factors. The group, organization, or individual 418 may be notified by paging, by e-mail, or by any other method desired.

Voice response unit acknowledgement (VRU Ack) 408, Fast database administration tool (FDAT) 410, and Fast ticket administration tool (FTAT) 412 represent inputs to fault management system 430. VRU Ack 408 is the acknowledgement procedure that allows administrators to acknowledge their alert and input the time in minutes necessary to remedy the problem. This data is in turn fed into the event correlation part of fault management system 430 where a timer is set and the status of the event is changed to acknowledged. Once the timer is reached, the status is changed back to OPEN and escalation continues.

FDAT 410 allows the administrator to define host groups, hosts within hostgroups, add events, FMPS, and pager groups as well as other information. This tool is also used to configure alerts for (event, host, FMP) triplets. FTAT 412 is the ticket management system that allows the administrator to acknowledge, close, and list open tickets. When actions like acknowledging or closing are performed, an event is sent to fault management system 430 from the backend that updates the state of the event in fault management system 430.

Reports 414 and logs 416 are outputs from fault management system 430 that are generated to track faults.

The system administrator enters into a database an escalation policy for different router groups and server groups. The escalation policy defines cool off periods, parties to notify, and response periods before notifying the next party in the notification list. The system administrator may have different parties to contact depending on the FMP, the type of event, or the host, or some combination of the three. Furthermore, the contacted party may be different depending on the time of day or other factors desired by the system administrator. Each router in a router group shares the same escalation policy and likewise for a server in a server group. A router group or server group can have one or more routers or servers. When a new router or server is added to the network, the system administrator adds the hostname for the new router or server to an appropriate router or server group in the database. The new router or server then automatically shares the escalation policy of the other routers or servers in the group. If a new interface device is added to an existing router, nothing need be done. The Internet Protocol address, or the IP address of the new device will be inserted in the FMP slot when an event is received from the new device by an adapter, such as a Netview adapter. The new device will share the same escalation policies as all other devices in the router group. Similarly, if a new filesystem or daemon is added to a server, these new devices will automatically by monitored by FAST.

Note that no new programming of the fault management system if required of the system administrator in adding new devices to the system. Therefore, there is no interruption of service of the fault management system and no downtime when new network changes take place and new elements need to be monitored. Thus, the present invention allows for easy expansion of monitored elements. Additionally, the present invention provides a reduction of cost by reducing the complexity and improving service as a result of the quick turnaround when adding new devices like hubs, routers, switches, applications, etc. to the infrastructure. Furthermore, the new device is instantly monitored as soon as the new FMP is added to the database of valid FMPs. Also the present invention provides flexibility in designating different organizations or groups to be responsible for different faults in the network. Adding the FMP as a correlated bit of information allows increased granularity and accuracy in tracking the network and system faults and better overall management and administration of a corporate wide network.

Figure 5:
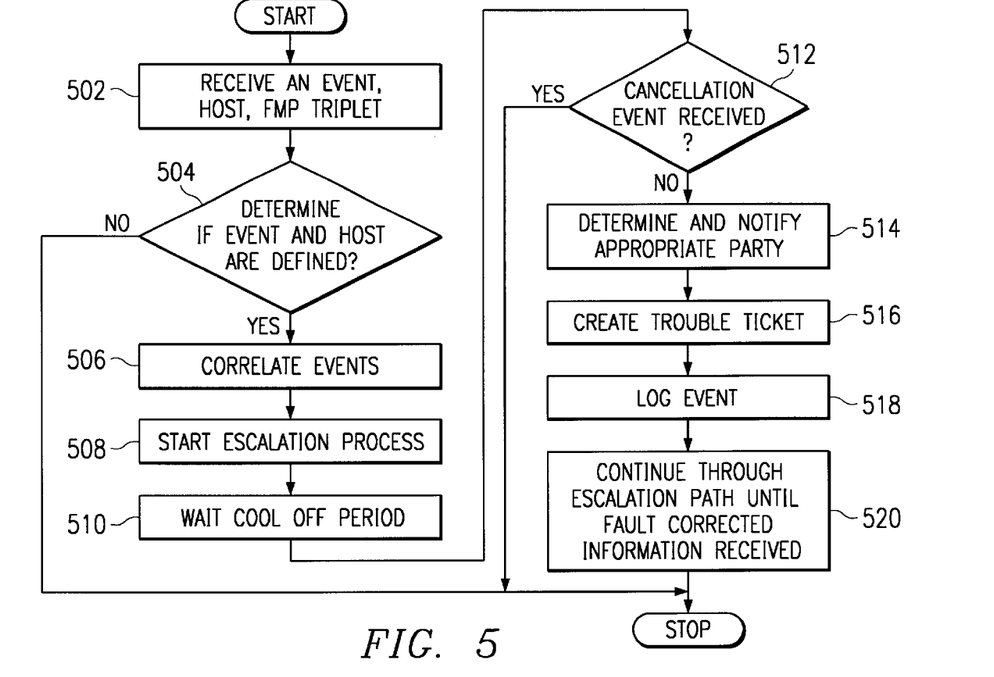
FIG. 5 shows a flow chart for adding fault monitoring points to the fault monitoring system when a new network device is added to the network according to the present invention.

Turning now to FIG. 5, there is shown a flowchart illustrating the method of notifying a responsible party of the existence of a fault on the network according to the present invention. To begin, the fault management system receives an event, host, FMP triplet from a polling engine, such as polling engine 402 or 404 in FIG. 4 (step 502). If the received event is not FMP ready (does not contain an FMP slot value) then the event needs to be preprocessed by the fault management system to make them FMP ready. An example will aid in illustrating how this is accomplished. Consider all Distributed Monitoring events. A rule is provided that maps the probe_arg slot value to the FMP slot value. Once the rule is in place, the fault monitoring system will monitor any new FMPs and process the event independent of the value of the FMP.

Next, fault management system 430 determines, by consulting a database, whether the received (event, host, FMP) is valid (step 504). If the event or host is not defined in the database, the (event, host, FMP) triplet is dropped and the process stops. If the event and host are defined in the database, and the FMP is not, the event is still not dropped.

The Default_FMP is used for the escalation path. If the event and host are valid, then the event, host, FMP triplet is correlated by fault management system 430 (step 506). First, duplication and correlation rules are applied to determine whether the (event, host, FMP) triplet has already been received and whether it is redundant determined as discussed above. If the event received is FMP ready (already has an FMP associated with it to create an (event, host, FMP) triplet), then the event is put into the escalation path (step 508). This placement occurs in all cases where the event source is configurable so that the events can be sent to the fault management system with the FMP slot value filled in. If the event source is unchangeable and the user does not need to correlate on the FMP, the correlation is performed on the (event, host) pair, and the default_fmp is used for escalation. If the event source is unchangeable and the FMP is required for correlation, the pre-processing of populating the FMP slot value can be done by a simple rule in TEC. Also, for events like Node Down on a host, there is no FMP involved.

The first step in the escalation process is to wait a predetermined amount of time (a cooling off time) (step 510) to determine if a cancellation event (a good event) will be received indicating that no notification needs to be sent (step 512). If a good event is received, the escalation process stops.

If a good event is not received in the cooloff timeout, then the database is consulted to determine the notification information and the target pager group is notified (step 514). The system then creates a trouble ticket (step 516) and logs the event (step 518) for archive purposes. The system then continues through the escalation path until a fault corrected information is received (step 520), at which point, the process stops.

After the first target pager group is notified (step 514), the timer for the event is set for a second level timeout period. The first target pager group must respond within this specified timeout period or the next target pager group will be notified. If the first target pager group responds within the specified timeout period, a second level timeout is re-set to a second specified time. During this time, if the first target pager group corrects the problem, the event is closed in fault management system 430 and the process stops.

If the event is still open when the second level timeout period expires (whether because the first group failed to respond or because the first group failed to correct the problem in the specified time), the pager group for the second level is notified. This escalation process continues until the last escalation level defined for the triplet is reached. After the last level is reached, all level pager groups are notified after a default timeout that can be set by the administrator. The alert to each pager group can be sent using any number of methods including using phone calls, e-mails, wireless notifications, etc.

Figure 6:
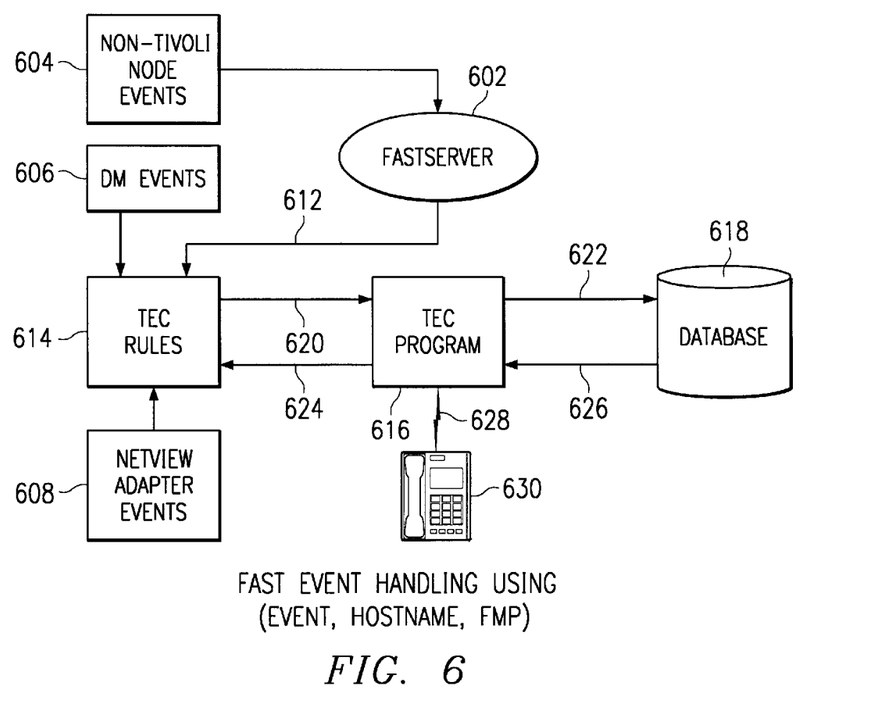
FIG. 6 shows a flowchart illustrating the method of notifying a responsible party of the existence of a fault on the network according to the present invention.

Turning now to FIG. 6, there is shown a block diagram illustrating a specific implementation of the present invention in a Tivoli Management Environment (TME) in a preferred embodiment of the present invention. Events 604 from non-Tivoli managed nodes are sent via postemsg (a method of posting events to a server) or the Fault Alert Services Tracking (FAST) client command, fastsend, to FASTSERVER 602. FASTSERVER 620 acts as a request broker communicating with the TEC server via "oserv" and having a socket interface to the client. In this case, the client is any executable/script that invokes the fastsend command to interact with the FASTSERVER. FASTSERVER 602 runs on a Tivoli Managed Node, which is necessary for FASTSERVER 620 to communicate with the TEC server (not shown) via "oserv." "Oserv" is the TME 10 object dispatcher and has multiple functions. One function of "Oserv" is the maintaining of the TME 10 object database on each system that has TME 10 installed and it routes object calls to the proper systems and objects. The TEC server includes TEC rules 614 and TEC program "fastaction" 616. Once it receives the event 604 information from the non-Tivoli nodes, it resends the event 604 to TEC 610 using wpostemsg. This resent event 612 includes the event, hostname, FMP triplet.

Events 606 from Tivoli's Distributed Monitoring are sent to the Tivoli Enterprise Console (TEC) 610 for fault event reception and correlation. The TEC rules 614 pre process the event and set the appropriate fmp slot value.

Events 608 from Netview Adapter are also sent to TEC 610 for fault event reception and correlation. The TME 10 Netview Adapter collects information, performs local filtering and converts relevant events into a format that can be used by the Tivoli Enterprise Console. Thus, Netview Adapter is a specific type of event adapter, wherein an event adapter is a process that monitors managed sources. When an event adapter detects an event from a source, it formats a message and sends it to the event server. Events 608 from the Netview Adapter include the event, hostname, FMP triplet and other event information.

Once an event is received by TEC 610, TEC Rules 614 are triggered and the external program fastaction 616 is invoked 620 to query 622 database 618. Database 618 contains, among other things, a list of valid FMPs and notification records for each event, host, FMP triplet. The notification records include escalation timeout information for each level, target pager groups that need to be notified, system downtime and outage information, etc. Database 618 is checked for the validity of the event, hostname, FMP triplet received and, if valid, returns 626 to TEC program 616 defined configurations for the event, hostname, FMP triplet. The granularity provided by FMPs enables different organizations/groups to take responsibility for monitoring different elements of a network (i.e., router, switch, hub, or other production servers).

The external program 616 helps set appropriate timers 624 and perform necessary operations on the expiration of a timer or on an event state change. The TEC program 616 is the interface between TEC Rules 614 and database 618. In addition to the functions stated above, TEC program 616 also performs logging and alert notification. The FMP is used in detecting who is to be notified and an alert including the event, host, FMP triplet is sent 628 to the appropriate administrator 630.

The FMP slot value is included in the TEC class file fast.baroc in this embodiment of the present invention. In the definition of the slot type, forcing duplication check on a slot value, i.e. specifying dup_detect=yes, ensures that the FMP is included for correlation in the TEC engine. Events with the same event and host, but a different FMP will be treated as a separate entity by the TEC engine. For example, the TEC engine will process Event Interface_Down, Host geetha.austin.ibm.com, fmp 9.53.134.120 and Event Interface_Down, Host geetha.austin.ibm.com, fmp 9.53.134.121 as two separate entities.

Figure 7:
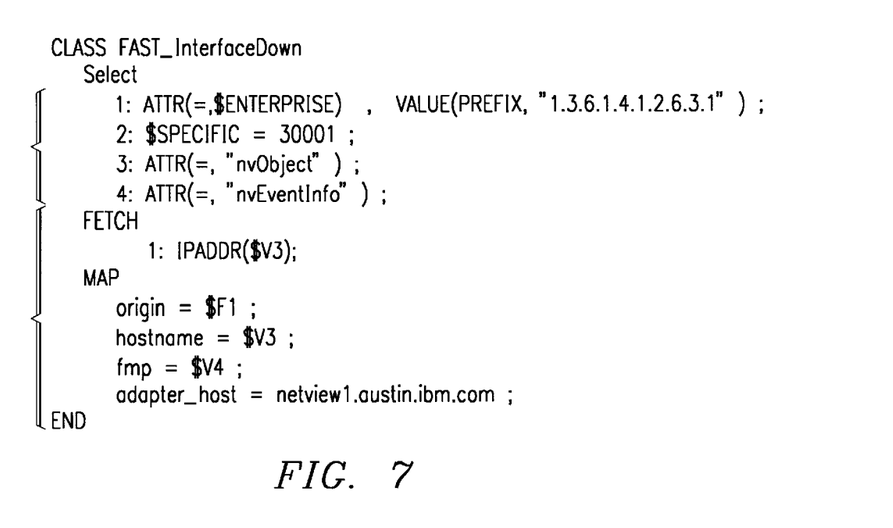
FIG. 7 shows a block diagram illustrating a specific implementation of the present invention in a Tivoli product suite in a preferred embodiment of the present invention.
Figure 8:
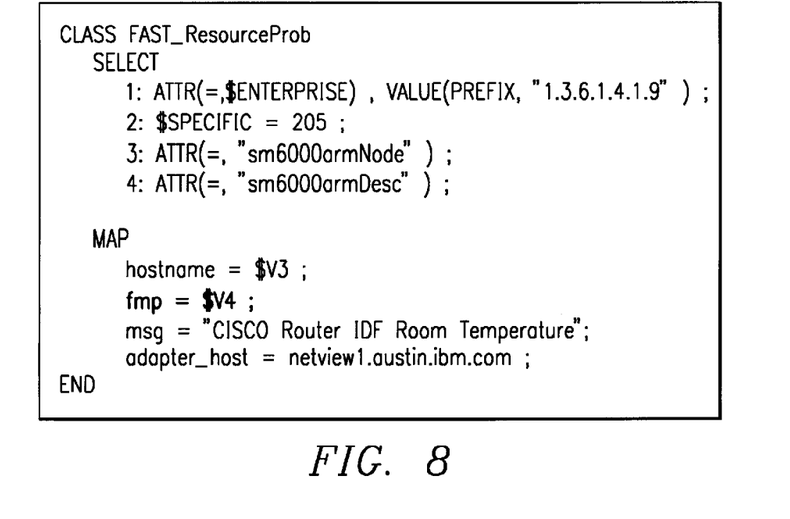

Examples of sending an FMP as an attribute from an adapter in accordance with the present invention are illustrated in FIGS. 7 and 8. The origin is the address of the resource that generated the event (not the IP address of the adapter that generated the event). The IP address of the hostname is fetched and is then placed in the origin slot value of the event before the (event, hostname, FMP) triplet is sent to TEC. For example, if an adapter is monitoring a router, this attribute would contain the IP address of the router, not the IP address of the system on which the adapter resides. Thus, in FIG. 7, $F1 is the IP address of the hostname. The adapter_host slot value in both the example in FIG. 7 and in FIG. 8 is netview1.austin.ibm.com. The adapter_host slot value is the name of the system on which the event adapter that reported the event is located. In FIG. 8, the message slot value, "msg", allows the administrator to infer information about the event. In the example shown in FIG. 8, the message information is that the CISCO router IDF is at room temperature. The events are FAST_ResourceProb and FAST_InterfaceDown. The msg is the message that is sent from the adapter, that is useful for the administrator to get more information on the problem.

An example of sending an FMP as an attribute from the command line or scripts is:

"fastsend -open -event=FAST_InterfaceDown -hostname=dceserver1.austin.ibm.com-fmp= 9.3.161.13-MSg="DEC Server Interface Down"

An example of sending fmp as an attribute from command line using wpostemsg is:

/usr/local/Tivoli/bin/aix4-r1/bin/wpostemsg -r CRITICAL -m "Test" status=OPEN hostname=fast1 fmp= 9.3.144.3 FAST_InterfaceDown NV6K By correlating on an event, host, FMP triplet rather than on an event, host pair, as was the case in the prior art, each FMP on the same event, host may be treated as a separate fault entity in the event correlation engine. Therefore, accuracy is added to the system since a problem will only be cancelled by an event from the same host with the exact same FMP. Previously, either a separate event had to be programmed into the fault management system for each network device (resulting in an enormous number of events) or, if separate events were not programmed, it was possible for an event from one device on a host could cancel an event from a different device on the same host. Both of these scenarios were undesirable, but are eliminated or greatly reduced with the present invention.

It should be noted that although the present invention has been described primarily with reference to allowing a default FMP value to be used for the escalation policy for cases in which the received FMP is not previously defined in the FDAT database, in other embodiments, for stricter control of the fault management system, any event, host, FMP received in which the FMP is not valid may be dropped rather than processed. Other such modifications to the FMP process are also possible. Note that allowing a default FMP to be used for escalation management covers cases in which an administrator is not aware of a newly added device to the network environment, but can still ensure that he receives notification if there is a failure of the newly added device. In this case, the default FMP is used only to retrieve escalation policy information from the database, and the FMP that is received from the event is used for correlation and notification of the problem.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a computer network, comprising the steps of:

receiving event information, wherein the event information includes an event and a hostname;

responsive to a determination that the event information includes a fault monitoring point, correlating the event, the hostname, and the fault monitoring point to determine a responsible party;

notifying the responsible party of the event; and responsive to a determination that no fault monitoring point was received, providing a default fault monitoring point.

2. The method as recited in claim 1, further comprising waiting a period of time after receiving the first event information before notifying said responsible party.

3. The method as recited in claim 2, wherein said event information is a first event information, said event is a first event, said hostname is a first hostname, and said fault monitoring point is a first fault monitoring point, and further comprising receiving a second event information during said period of time, wherein said second event information includes a second event, a second hostname, and a second fault monitoring point; and responsive to a determination that said second hostname is the same as said first hostname, said first fault monitoring point is the same as said second fault monitoring point, and said second event is a cancellation of said first event, refraining from notifying said responsible party.

4. A system for managing a computer network, comprising:

means for receiving event information, wherein the event information includes an event and a hostname;

means, responsive to a determination that the event information includes a fault monitoring point, for correlating the event, the hostname, and the fault monitoring point to determine a responsible party;

means for notifying the responsible party of the event; and means, responsive to a determination that no fault monitoring point was received, for providing a default fault monitoring point.

5. The system as recited in claim 4, further comprising means for waiting a period of time after receiving the first event information before notifying said responsible party.

6. The system as recited in claim 5, wherein said event information is a first event information, said event is a first event, said hostname is a first hostname, and said fault monitoring point is a first fault monitoring point, and further comprising means for receiving a second event information during said period of time, wherein said second event information includes a second event, a second hostname, and a second fault monitoring point; and responsive to a determination that said second hostname is the same as said first hostname, said first fault monitoring point is the same as said second fault monitoring point, and said second event is a cancellation of said first event, refraining from notifying said responsible party.

7. A computer program product in computer readable media for use in a data processing system, for managing a computer network, comprising:

first instructions for receiving event information, wherein the event information includes an event and a hostname;

second instructions, responsive to a determination that the event information includes a fault monitoring point, for correlating the event, the hostname, and the fault monitoring point to determine a responsible party;

third instructions for notifying the responsible party of the event; and fourth instructions, responsive to a determination that no fault monitoring point was received, for providing a default fault monitoring point.

8. The computer program product as recited in claim 7, further comprising instructions for waiting a period of time after receiving the first event information before notifying said responsible party.

9. The computer program product as recited in claim 8, wherein said event information is a first event information, said event is a first event, said hostname is a first hostname, and said fault monitoring point is a first fault monitoring point, and further comprising instructions for receiving a second event information during said period of time, wherein said second event information includes a second event, a second hostname, and a second fault monitoring point; and responsive to a determination that said second hostname is the same as said first hostname, said first fault monitoring point is the same as said second fault monitoring point, and said second event is a cancellation of said first event, refraining from notifying said responsible party.

\* \* \* \* \*